United States Patent
Turfitt

(10) Patent No.: US 6,883,412 B1
(45) Date of Patent: Apr. 26, 2005

(54) METHOD OF FABRICATING CIRCULAR SAW BLADES WITH CUTTING TEETH COMPOSED OF ULTRAHARD TOOL MATERIAL

(75) Inventor: Ron Turfitt, Doylestown, PA (US)

(73) Assignee: Sheffield Saw & Tool Co., Inc., Danboro, PA (US)

( * ) Notice: Subject to any disclaimer, the term of this patent is extended or adjusted under 35 U.S.C. 154(b) by 0 days.

(21) Appl. No.: 09/469,673

(22) Filed: Dec. 22, 1999

Related U.S. Application Data
(60) Provisional application No. 60/114,155, filed on Dec. 29, 1998.

(51) Int. Cl.[7] ............................................. B27B 33/02
(52) U.S. Cl. ............................... 83/835; 83/851; 83/855
(58) Field of Search ........................... 83/835, 839, 846, 83/844, 847, 848, 851, 852, 854, 855; 76/112, 47.1, 46

(56) References Cited

U.S. PATENT DOCUMENTS

| | | | | |
|---|---|---|---|---|
| 907,374 A | * | 12/1908 | Krabbe | 76/112 X |
| 2,624,381 A | * | 1/1953 | Von Der Werth | 83/835 X |
| 2,714,317 A | * | 8/1955 | Drake | 76/112 |
| 3,034,378 A | * | 5/1962 | Anderson | 76/112 |
| 3,133,533 A | * | 5/1964 | Sprague | 76/112 X |
| 3,308,859 A | * | 3/1967 | Ehlen | 76/112 X |
| 3,696,708 A | * | 10/1972 | Lopas | 83/3 |
| 3,736,828 A | * | 6/1973 | Funakubo | 83/661 |
| 4,039,011 A | * | 8/1977 | Sword | 83/835 X |
| 4,135,421 A | * | 1/1979 | Bertram et al. | 83/835 |
| 4,324,163 A | * | 4/1982 | LaVelle | 83/855 |
| 4,462,293 A | * | 7/1984 | Gunzner | 83/855 |
| 4,587,876 A | * | 5/1986 | Erhardt | 83/839 |
| 4,784,033 A | * | 11/1988 | Hayden et al. | 83/835 |
| 4,889,025 A | * | 12/1989 | Collett | 83/835 |
| 4,949,599 A | * | 8/1990 | Iseli | 76/112 |
| 5,054,354 A | * | 10/1991 | Kubis | 83/835 |
| 5,427,000 A | * | 6/1995 | Hellbergh | 76/112 |
| 5,453,041 A | * | 9/1995 | Oliver | 76/112 X |
| 5,794,503 A | * | 8/1998 | Asada | 83/835 |
| 5,813,308 A | * | 9/1998 | Wildey et al. | 83/835 |
| 6,000,312 A | * | 12/1999 | Viswanadham et al. | 83/835 X |
| 6,035,844 A | * | 3/2000 | Otani et al. | 83/835 |
| 6,065,370 A | * | 5/2000 | Curtsinger et al. | 76/112 |

FOREIGN PATENT DOCUMENTS

| | | | | |
|---|---|---|---|---|
| DE | 4200420 A1 | * | 7/1993 | 83/835 |
| FR | 2679475 A1 | * | 1/1993 | 83/835 |
| JP | 57-138522 | * | 8/1982 | 83/851 |
| JP | 62-039113 | * | 2/1987 | 83/835 |
| JP | 04-027501 | * | 1/1992 | 83/835 |

\* cited by examiner

Primary Examiner—Charles Goodman
(74) Attorney, Agent, or Firm—Groover & Holmes

(57) ABSTRACT

A cutting tool having a cutting tip partially constructed from ultrahard materials. The cutting tip is oriented on the cutting tool such that the face has a reduced surface area. This has the effect of greatly reducing cutting tool costs and of maintaining the radius of the blade essentially constant even after repeated sharpening of the cutting tip.

17 Claims, 5 Drawing Sheets

METHOD OF FABRICATING CIRCULAR SAW BLADES WITH CUTTING TEETH COMPOSED OF ULTRAHARD TOOL MATERIAL

This application claims benefit of 60/114,155 file Dec. 29, 1998.

BACKGROUND AND SUMMARY OF THE INVENTION

The present invention relates broadly to saws and more particularly to circular saws and milling cutters having ultrahard, wear-resistant teeth, principally used for cutting very hard and abrasive material.

Background: Carbide-Toothed Circular Saws

Cutting tools (especially woodworking tools) often use inserted teeth of a material which is harder than steel. The most common material used for this is a "cemented carbide," which typically includes small grains of tungsten carbide embedded in a matrix of a high-temperature metal (typically cobalt). Typically the main part of the saw blade is a steel plate, and the carbide teeth are brazed onto the leading edge of tooth profiles which are cut out from the steel plate.

This process limits the minimum spacing between adjacent teeth, and hence limits the number of teeth for a given blade size. For example, carbide-tipped ten-inch blades are currently available with up to 100 teeth, but no more. This implies that the pitch of a conventional carbide-tipped saw cannot be less than one centimeter.

More recently the same technology has been applied to use polycrystalline diamond inserts. However, it appears that the same limitations on tooth pitch will still apply.

Background: Grit-Surfaced (Non-Toothed) "Saws"

A common type of cutting tool is a circular blade which does not have shaped teeth at its edge, but which is simply coated with a diamond grit. Such cutting tools are commonly referred to as diamond "saws," but in fact they do not perform the same type of material-removal action as is performed by a saw with shaped teeth. A saw with shaped teeth, when it is operating correctly, will carve off chips of material. By contrast, a grit-coated blade will have more of a scraping action. (See generally Jim Effner, Chisels on a wheel (1992); and Peter Koch, Utilization of Hardwoods Growing on Southern Pine Sites (1985); both of which are hereby incorporated by reference.) A cutting action is greatly preferable for many applications, to produce a cleaner cut, lower temperature, and lower power requirements.

Background: Cutting Thin Materials

Sawing action is smoothest when there is always at least one tooth in the cut. For cutting very thin materials, this requires a very fine tooth pitch. If the tooth pitch cannot be made as small as the material thickness, it should still be made as small as possible.

For example, for cutting aluminum extrusions with ten-inch blades, blades with up to 300 teeth are often used; however, these are steel blades, and become dull relatively quickly.

Background: Circular Saws with Tooth Segments

Large circular saws (e.g. 20 to 60 inches in diameter) have long been designed with removable teeth. In a sawmill environment, this is very advantageous, because a damaged tooth can be replaced or resharpened quickly and easily without dismounting the entire blade. A variation of this, as described for example in U.S. Pat. No. 3,633,637, is to use removable multi-tooth segments.

Background: Hard Materials as Applied to Circular Cutting Tools

Since the beginning of the Bronze Age, toolmakers have sought to improve the durability and functionality of tools by modifying their cutting edges. Early processes included work hardening of bronze and adding steel edges to iron implements. The process continues to this day as new, super-hard materials are developed and new applications are found for older ones.

The advantages of extremely hard cutting edges supported by a tough shock-resistant steel band or disk have been recognized for many years. Solutions evolved as described by Neibl, U.S. Pat. No. 907,167, and by Blum, U.S. Pat. No. 1,535,096, both of which are hereby incorporated by reference, where a band of very hard steel was welded to another supporting band of softer steel and teeth were then cut into the hard steel band. Whitaker, U.S. Pat. No. 1,130,649, and Napier, U.S. Pat. No. 1,352,140, both of which are hereby incorporated by reference, approach the same problem by applying special heat treatment and tempering to the cutting edge.

Background: Tungsten Carbide Applications

Following the development of tungsten carbide materials produced by powdered metal technology as described by Schroeter, U.S. Pat. No. 1,594,615, which is hereby incorporated by reference, tungsten carbide moved steadily into tooling applications. For examples of fastening carbide or hard steel into the cutting edges of steel saws see Wilkie, U.S. Pat. No. 2,318,549, and Kolesh, U.S. Pat. No. 2,880,769, both of which are hereby incorporated by reference.

At present, it is common industry practice to tip circular cutting tools with materials that are harder than the hardest of steels. A common material employed is a "cemented carbide," which typically includes small grains of tungsten carbide bonded into a matrix at high temperatures and pressures by another metal (typically cobalt). Because both the strength and hardness are derived from the compound of tungsten and carbon (WC), and another material (frequently cobalt) serves merely as a binder, the material is commonly referred to as "cemented carbide" which, as a matter of convenience, will hereafter be referred to simply as "carbide." Carbide saw tips have a hardness of about 92 on the Rockwell A hardness scale.

Some firms manufacture only the steel bodies of milling cutters and circular saws, which are in turn sold to other manufacturers who specialize in applying carbide cutting edges. These bodies, which are normally made of high-carbon alloy tool steel, are hardened, tempered and finished in every way except for tipping. Some tools, principally large milling cutters, may use a clamping mechanism by which carbide cutters are incorporated as replaceable "inserts." An alternative and more common method of incorporating carbide cutting tips into milling cutters and circular saws is by brazing them directly into pockets ground into the periphery of the cutting tool. The tips may be ¼ to ½ inches long, 0.062 to 0.093 inches thick, and from 0.10 to 0.375 inches wide, depending on the width of the finished tool.

Other manufacturers offer complete saws and milling cutters with carbide tips installed. In either case, the same standard carbide tips are used in the fabrication of the blades. The normal industry practice is to affix the unsharpened carbide tips to the steel bodies by means of brazing, typically with silver bearing brazing material. The tooth geometry is then ground into the carbide by special tools designed for that purpose. FIG. 2 shows a section of a typical configuration of a Carbide Tipped circular saw.

Background: Carbide Tip Failure Mode

Carbide tips installed in the configuration shown by FIG. 1 are fabricated and sharpened by grinding the top, sides, and face of the carbide tip. Likewise, when the carbide tips are worn in use, the tips are generally resharpened by grinding the face and the tip of the carbide cutter. The end of a tool's useful life occurs when, after repeated sharpening of the carbide tip, the face is ground away to the point that it becomes too thin for further sharpening. It is undesirable to grind more off the top of a carbide tip than is absolutely necessary because the effective cutting radius of the tool would be reduced with each regrind. The cutting radius is important because machines that employ cutting tools generally have only a small amount of adjustment to compensate for a change in tool diameter. In addition, many applications permit only a limited tolerance of cutting tool diameter.

Background: Ultrahard Tool Materials as Applied to Circular Cutting Tools

Recently, man-made ultrahard crystalline and polycrystalline compounds have become available, making possible tremendous advances in cutting tool design. Thus, it is now possible to machine substances that have previously been extremely difficult to fabricate. The most common ultrahard materials used in these tools are polycrystalline diamond (PCD), which is 3.6 times harder than tungsten carbide, and cubic boron nitride (CBN), which is 2.8 times harder than carbide.

In practice, thin layers (around 0.5 mm to 1.5 mm thick) of PCD or CBN are bonded to a tungsten carbide substrate. This tungsten carbide substrate typically is in the form of a wafer having a one to one ratio with the PCD or CBN for a combined thickness of around 1.5 to 3.5 mm and a diameter of around 25 mm. Using sophisticated computer controlled tools, these disks are sliced into small pieces which are dimensionally similar to standard carbide blanks and inserts. These pieces are typically brazed or otherwise incorporated onto tool steel bodies in the same manner as carbide tips and inserts. After incorporation onto the tool steel bodies, these ultrahard tips are sharpened by various special techniques.

Background: Ultrahard Tool Braze Configuration

In most applications, the same braze configuration as that used for carbide tools is adequate to support ultrahard tools, the lower strength of the braze material notwithstanding. However, there is a very important and not generally recognized penalty for the use of a "carbide type" brazing configuration, which well be discussed in detail later. FIG. 3 shows a section of a typical cutting tool (in this case a saw) using ultrahard materials. The brazing is facilitated by the carbide substrate which makes the attachment of ultrahard cutting tips very similar to that of attaching standard carbide tips to a steel saw or milling cutter body. However, there are other considerations which need to be taken into account. If the ultrahard tips, specifically those of PCD, are overheated during the brazing process, they revert to a softer form of carbon (graphite), thus rendering the tool useless. This limitation on temperature requires a brazing alloy whose strength is less than optimum for the joint. The ability of the tool body to retain the tip and prevent it from being torn off during operation depends on the surface of the brazed joint and the manner in which it is mounted.

Background: Performance of Ultrahard Materials

The ultrahard materials have truly amazing performance in their proper applications. A PCD tool cutting wooden particleboard may outlast 100 carbide tools of identical construction. However, PCD cannot cut ferrous metals because of a rapid chemical reaction between diamond and iron causing the diamond to revert to graphite. CBN, on the other hand, is capable of machining most materials that PCD cannot. These material include hardened steels, cast iron, and many superalloys. Both PCD and CBN tools are being used in a rapidly expanding number of applications, particularly in the automotive and woodworking industries.

Background: Cost Considerations for Ultrahard Materials

Despite their extraordinary performance, the application of these ultrahard materials is frequently limited by their high cost, which is at least ten times that of tungsten carbide. In addition, because of their extreme hardness, they can only be shaped with great difficulty. PCD can only be ground by special diamond grinding wheels that are no harder than the PCD, and therefore, have a short service life. Other means of shaping PCD include electrodischarge machining (EDM) by either wire or shaped carbon electrode methods. Both of these methods require expensive, specialized computer controlled equipment that further adds to the cost of the tools in which they are incorporated.

Background: Differences Between Ultrahard Materials and Carbide Materials

There are other very important differences in the properties of the ultrahard materials and of the carbide materials that it replaces. PCD tools, unlike carbide tools of identical form can neither be fabricated nor sharpened by grinding the face of the cutting tip. The face of the tip is simply too hard to grind over the area required. Even if the face could be ground, repeated grindings would soon cut away the thin layer of diamond leaving only the carbide substrate. Although the face of a CBN cutting tip can be ground using diamond-grinding wheels, the layer of CBN is even thinner than the diamond. This means that the only practical method for sharpening and servicing rotating tools with PCD and CBN cutters is to lightly grind or otherwise shape the top of the cutting tooth. However, as mentioned before, sharpening the top reduces the cutting diameter of the cutting tool.

Not only is tungsten carbide relatively hard, it is tough. Its failure mode is through abrasive wear. PCD and CBN on the other hand are extremely brittle. The failure mode for these ultrahard materials is generally through microchipping of the cutting edge. To minimize chipping, these ultrahard materials must be rigidly mounted with a minimum of overhang. The typical carbide type tool mounting is less than optimum and, in many cases, unsatisfactory for ultrahard cutting tips because of the lack of support of the entire tip and excessive overhang. This can be seen by referring to FIGS. 2 and 3 where the cutting tip extends out past the extent of the carrier blade. In addition, since ultrahard materials generally become "dull" because of microchipping of their cutting edges, generally, very little material removal during sharpening is required. If the tooth is chipped or broken, it is replaced.

The thickness of the carbide and the size of the brazed area provided by the pocket has an important bearing on the integrity of the joint. However, the same factors that favor a strong brazed joint, also require that a larger amount of very expensive PCD or CBN be used than would be required in a better embodiment for this material.

Method of Fabricating Circular Saw Blades with Cutting Teeth Composed of Ultrahard Tool Material The present application discloses a cutting tool having a cutting tip composed of two layers. One layer is constructed of an ultrahard material; the other layer is constructed of a non-ultrahard material. The principal axis of the cutting tip is oriented so that the surface of the ultrahard material is almost perpendicular to a radius of the carrier blade rather than parallel to the radius as is the case conventionally.

The disclosed innovations, in various embodiments, provide one or more of at least the following advantages: The cutting force is directed principally along the axis of the principal axis (which is parallel to a tangent line at the edge of the carrier blade) of the cutter tip, thus reducing the stress on the braze joint and adding to the rigidity of the cutter tip. Because of the reduced stress in the braze joint, the cutter tools can be designed with a smaller joint area. This has a profound effect on the cost of a cutting tool utilizing ultrahard materials since their cost is directly proportional to the surface area of the material used. The cutting tip can be sharpened and fabricated on conventional machinery since it is perfectly feasible to grind the face 180 in FIGS. 1–4 of the tool and there is no need to grind the top 170 in FIGS. 1–4 of the cutter. Therefore no new machinery is needed to construct or sharpen the cutting tool of the present application. Furthermore, since it is unnecessary to sharpen the cutter tip by grinding its top and only a very small amount of material need be removed from the face during sharpening, the cutting radius of the blade is essentially constant even after repeated sharpening. Additionally, because of the orientation of the cutting tip, the tip must be replaced less often than a tip oriented according to the conventional geometry. Therefore, there is less down time which is highly important in industry where down time is most costly.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

Braze: to solder with brass or other hard alloy.

Carrier Blade: a blade, typically made of steel, to which a cutting tip is attached.

Carbide: a material more commonly referred to as cemented carbide which typically includes small grains of tungsten carbide bonded into a matrix at high temperatures and pressure by another metal which is typically cobalt. The name cemented carbide comes from the fact the both the strength and hardness of the substance are derived from the compound of tungsten and carbon (WC), and another material (frequently cobalt) serves merely as a binder.

Chatter: as used herein is vibration or movement of the cutting tool engaged in the cut due to exterior forces applied against an inadequately supported cutting tip.

Cutting Tip: a material that is usually harder than steel that is attached to the tips of a carrier blade to provide a harder cutting surface. (See FIGS. 1, 2, and 3 for an illustration).

Solder: to make a tight junction of metallic sheets, piping, and the like, by the application of a molten alloy.

Tungsten Carbide: (WC), a cemented carbide which is harder than steel.

Pocket: an indention in a carrier blade shaped to receive a cutting tip. (See FIGS. 1, 2, and 3 for an illustration).

Superhard Material: any material harder than steel.

Ultrahard Materials: any material harder than tungsten carbide, including but not limited to polycrystalline diamond (PCD) and cubic boron nitride (CBN).

Detailed Description of the Presently Preferred Embodiment

The present application discloses an improved cutting tool and method for making a cutting tool utilizing cutting edges composed of ultrahard materials. Ultrahard materials as used in this application are defined as any material harder than tungsten carbide. The ultrahard materials include but are not limited to polycrystalline diamond (PCD) and cubic boron nitride (CBN). This application describes a method of mounting such materials in such a way as to eliminate or greatly reduce problems of incorporating these materials. Implicit in the disclosed teachings is a major reduction in tool cost.

Figure 1:
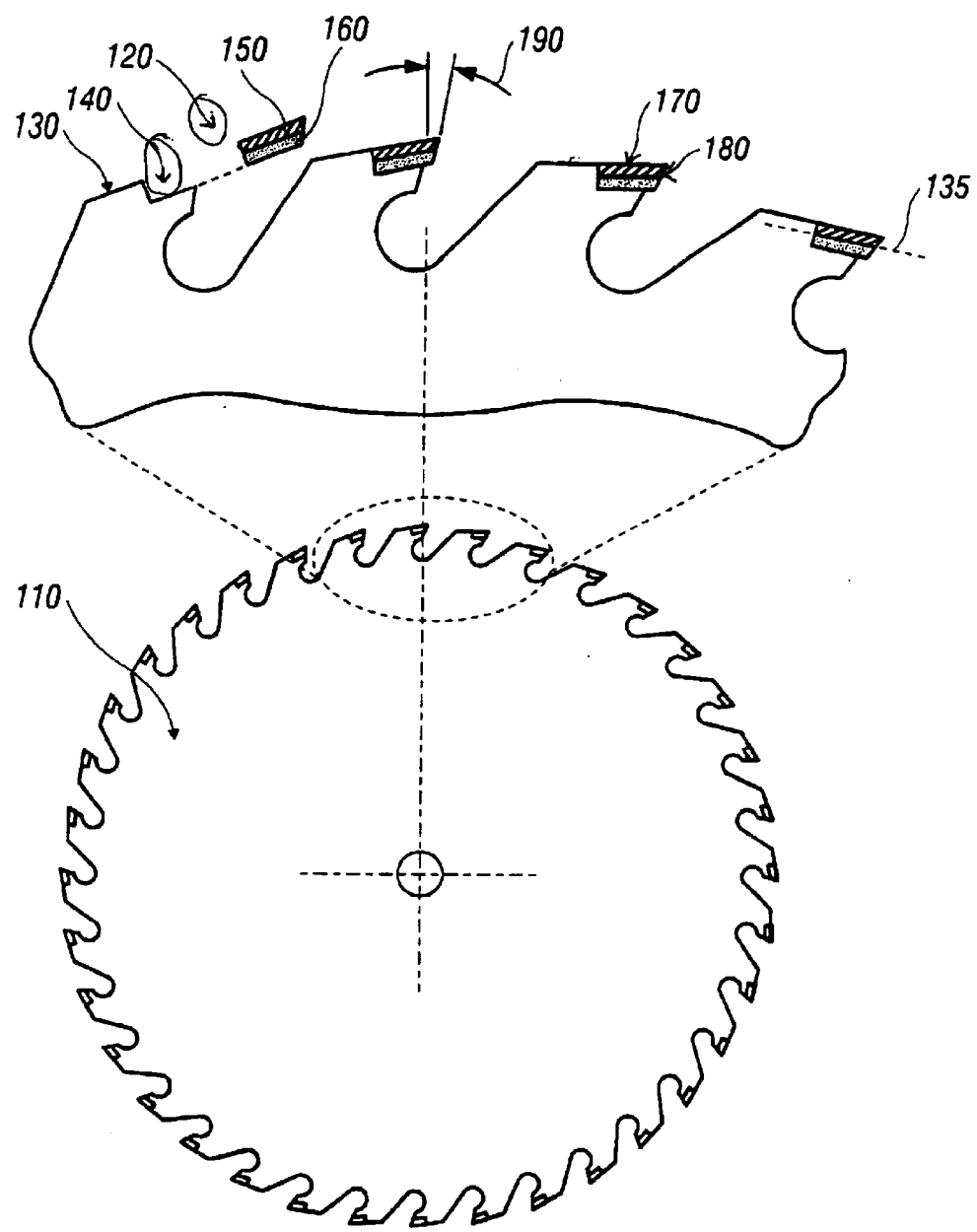
FIG. 1 shows a circular saw using the novel cutting tip geometry of the present application.

To facilitate description of the presently preferred embodiments, the ultrahard cutting tips will be illustrated using a circular saw blade as shown in FIG. 1. (A blow up of the edge of the saw is also shown in FIG. 1 for added clarity.) However, it should be noted that the same teachings have application in principle to many other types of rotating and linear cutting devices, including, but not limited to, milling cutters, band saw blades, shaper blades, and form and panel cutters. In fact, the present teaching may have application in any other device that utilizes ultrahard materials and which might benefit from minimizing cost, improvement of rigidity, and simplified sharpening.

Figure 2:
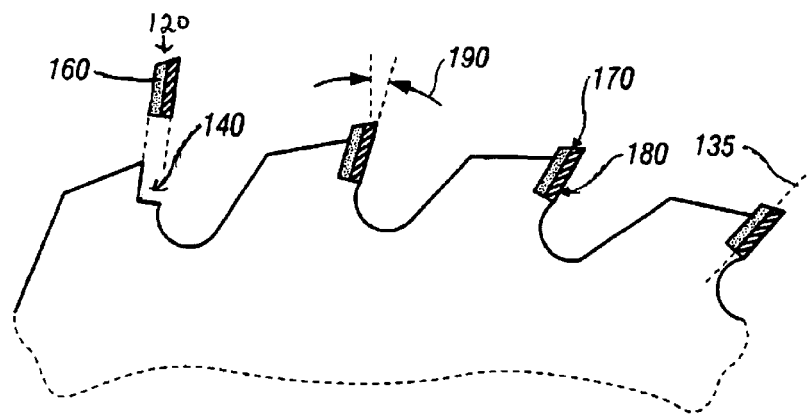
FIG. 2 shows a section of a circular saw with carbide tips.
Figure 3:
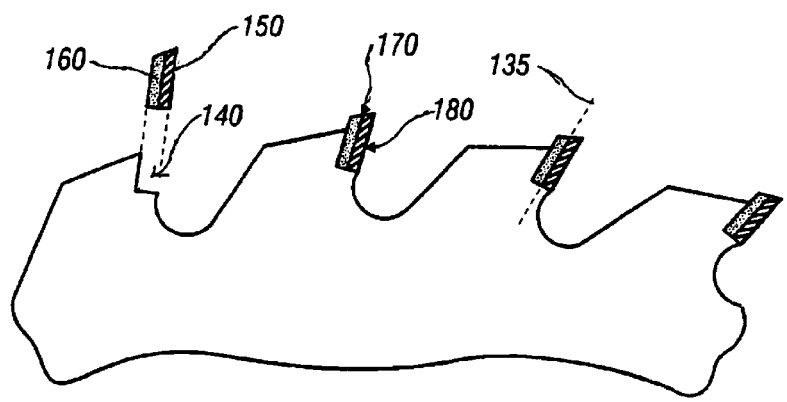
FIG. 3 shows a section of a circular saw using ultrahard materials for the cutting tips.

A carrier blade 110 has a supporting blade 130 with a pocket 140 for holding a cutting tip 120. In this example, the pocket shape is rectangular. The cutting tip consists of a slab of ultrahard material 150 (for example PCD or CBN) bonded to a slab of carbide 160. The cutting tip 120 is attached to the carrier blade 110 by brazing the cutting tip 120 into the pocket 140 of the carrier blade 110. The plane of the joint between the slab of ultrahard material 150 and the slab of carbide 160 is oriented parallel to the longitudinal axis 135 of the cutting tip. The longitudinal axis is oriented such that it is less than 45 degrees away from a line that is tangent to the edge of the carrier blade 110. The slab of ultrahard material is on the top 170 side of the cutting tip 120 rather than on the face 180 of the cutting tip as it is in the conventional orientation as shown in FIGS. 2 and 3. The rake angle 190 is the angle between the plane of the face 180 of the cutting tip 120 and a line that is perpendicular to a tangent to the edge of the carrier blade 110. The rake angle in the present example is +10 degrees. However, other rake angles could be used as will be described later.

The basis of the present teachings is found in the geometry of the cutting tool and in the way in which it is mounted with respect to its carrier. The axis of the cutting tip 120 is rotated a nominal 90 degrees away from the conventional configuration so that the surface of the ultrahard material on the tip is approximately parallel to a tangent line at the carrier blade's periphery. This configuration is illustrated in FIG. 1 with a segment of the edge of the carrier blade blown up to show more detail. This configuration results in a number of improvements for tips incorporating PCD or CBN materials. The surface which had been at the top of the cutter in the conventional fabrication becomes the face in the present embodiment. It is quite feasible to present the cutting edge to the work at the angle commonly used in the conventional configuration. The angle of attack of conventional cutters is determined by the "hook" angle, which is typically −4 degrees to 20 degrees for carbide tools and −4 degrees to 15 degrees for PCD tools. In the geometry illustrated in FIG. 1, the term "hook" is replaced by "rake" to be consistent with single point cutting tool nomenclature.

Figure 5:
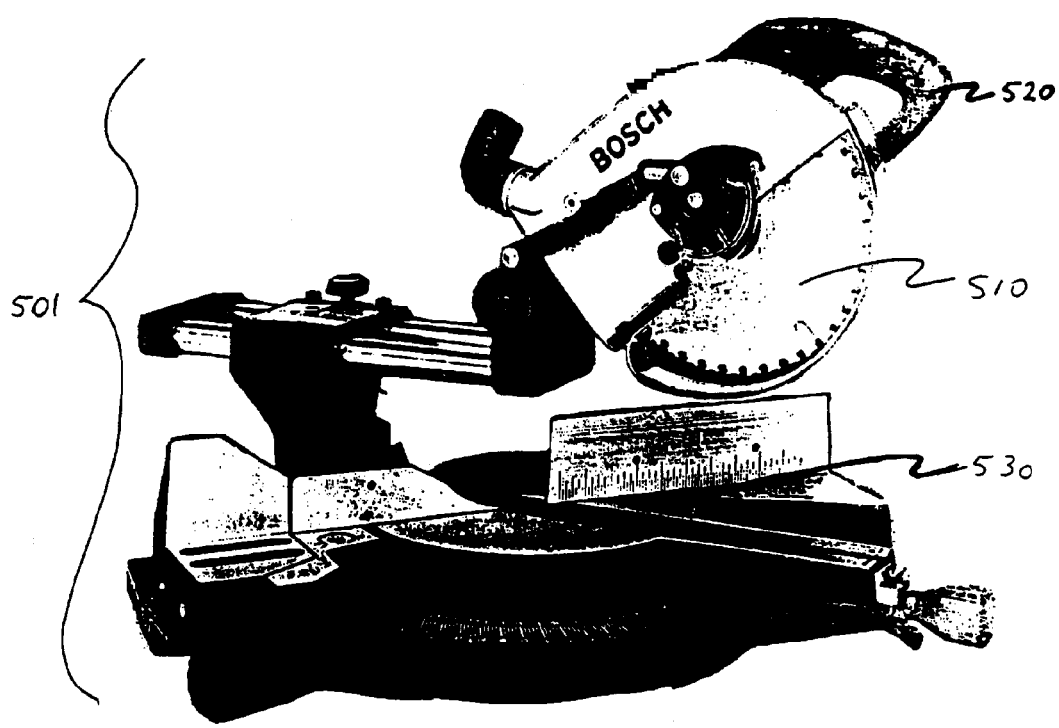
FIG. 5 shows a cutting machine with a circular saw.

A saw with its cutting tip oriented according to the novel teachings of the present application may be incorporated into a cutting machine for industrial purposes. An example of such a cutting machine incorporating a circular saw suitable for use with the cutting tips presently disclosed is shown in FIG. 5. A cutoff saw 501 is shown has a circular blade 510, a motor (riot shown) for driving the saw, a handle 520 for a user to move the blade up and down, and a table 530 to place the material for cutting.

One advantage of the presently preferred embodiment is that the cutting force is directed principally along the longitudinal axis 135 of the cutter tip. This reduces the stress on the braze joint and adds to the cutter rigidity. Cutting forces are resisted by solid support from the steel body of the blade. In conventional tool geometry, as shown in FIG. 3, the cutting force is perpendicular to the longitudinal axis 135 of the cutting tip. This produces a shearing compressive stress on the tip of the cutter and tensile stress on the braze joint. The extenuation of the cutter beyond the supporting steel blade reduces the system's rigidity. This reduction in rigidity results in chatter. While the amount of chatter is quite small, it is, nevertheless, a major cause of microchip type failure in ultrahard materials.

Another advantage of the presently preferred embodiment is that because of the reduced stress in the braze joint, tools may be designed with a smaller joint area. This has a profound effect on the cost of a tool utilizing ultrahard materials since their cost is directly proportional to the surface area of the material used in any one application. Through the use of the tool configuration shown in FIG. 1, a 50% reduction in tool costs may be readily realized.

The cutting tool of the present embodiment may be sharpened and fabricated on conventional machinery since it is perfectly feasible to grind the face of the cutter and there is no need to grind the top of the cutter. Furthermore, since it is unnecessary to sharpen the cutter tip by grinding its top and since only a very small amount of material need be removed from the face during sharpening, the cutting radius of the blade is essentially constant even after repeated sharpening.

Alternative Embodiment: Parallelogram Cutting Tip

Figure 7:
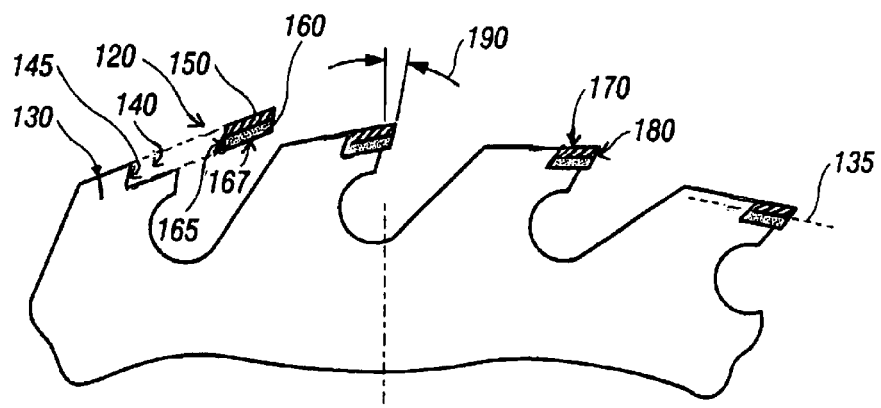
FIG. 7 shows a section of a circular saw using cutting tip with parallelogram geometry.

In an alternate embodiment, the cutting tip 120' is constructed such that the back side 165 (side opposite the face 180) of the cutting tip 120' is not normal to the bottom side 167 of the cutting tip 120' as shown in FIG. 7. The pocket 140 in the carrier blade 110 is cut such that the back side 145 of the pocket 140 is not normal to a tangent line to the edge of the carrier blade at the pocket 140. With such a cutting tip 120' geometry, construction of the cutting tip 120' is simplified. This is so because only one angle cutting for the electrodischarge machine (EDM) used in cutting the tip 120' from a wafer need be set. Although both the face 180 and back side 165 of the cutting tip 120' are parallel after construction, the back 165 and face 180 may not be parallel in operation depending on what rake angle 190 is chosen. An additional advantage to this configuration is that the pocket 140 created in this orientation provides greater support for the cutting tip 120'.

Alternative Embodiment: Saw with Alternating Ultrahard and Non-Ultrahard Cutting Tips In an alternate embodiment, the carrier blade 110 has cutting tips 120 such that not all the cutting tips 120 are constructed out of ultrahard material. In one example, every other cutting tip 120 is constructed from an ultrahard material such as PCD bonded onto a carbide such as WC, while the intervening cutting tips 120" are constructed from a non-ultrahard material such as a carbide. In this embodiment the non-ultrahard cutting tips 120" are used as the "roughing" tips and the ultrahard cutting tips 120 are used as the "finishing" tips.

Alternative Embodiment: Ultrahard Material without Carbide

In an alternate embodiment, the carrier blade 110 has cutting tips 121 such that not all the cutting tips 120 and 121 are constructed out of ultrahard material. In one example, every other cutting tip is constructed from an ultrahard material such as PCD bonded onto a carbide such as WC while the intervening cutting tips are constructed from a non-ultrahard material such as a carbide. The non-ultrahard cutting tips, depicted with double crosshatching in FIG. 7, are used as the "roughing" tips and the ultrahard cutting tips are used as the "finishing" tips.

Alternative Embodiment: Band Saw

Figure 4:
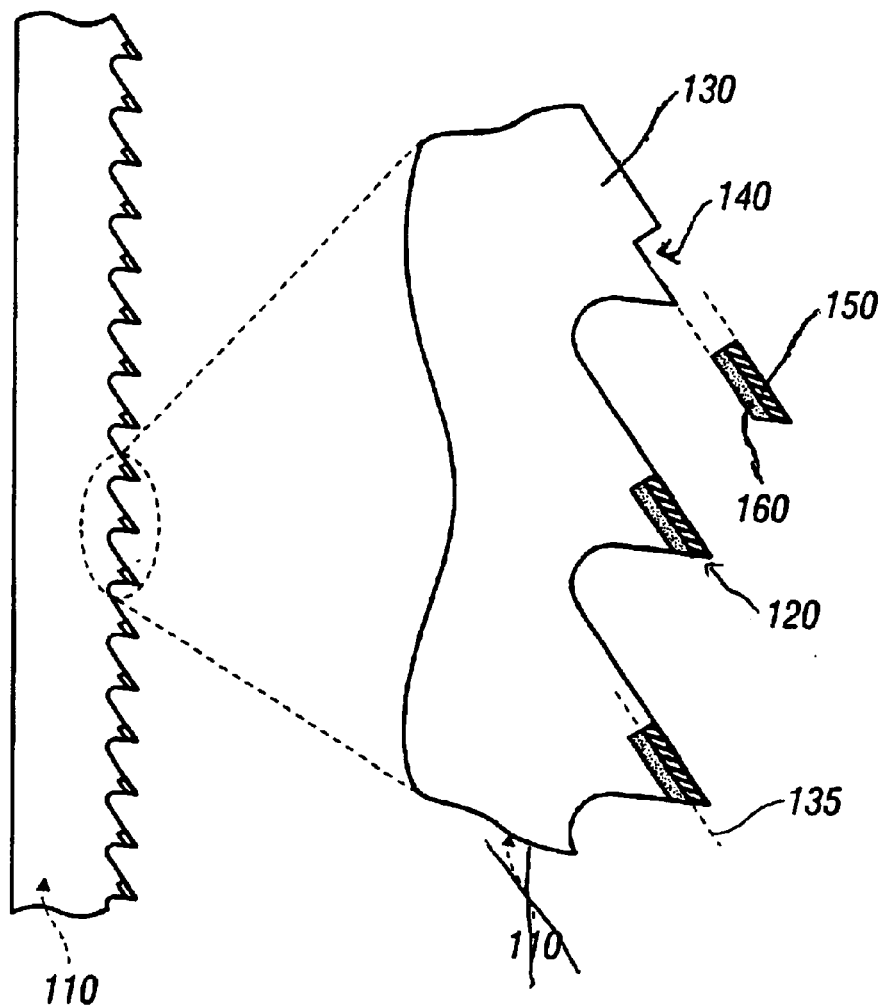
FIG. 4 shows a band saw using the novel cutting tip geometry of the present application.
Figure 6:
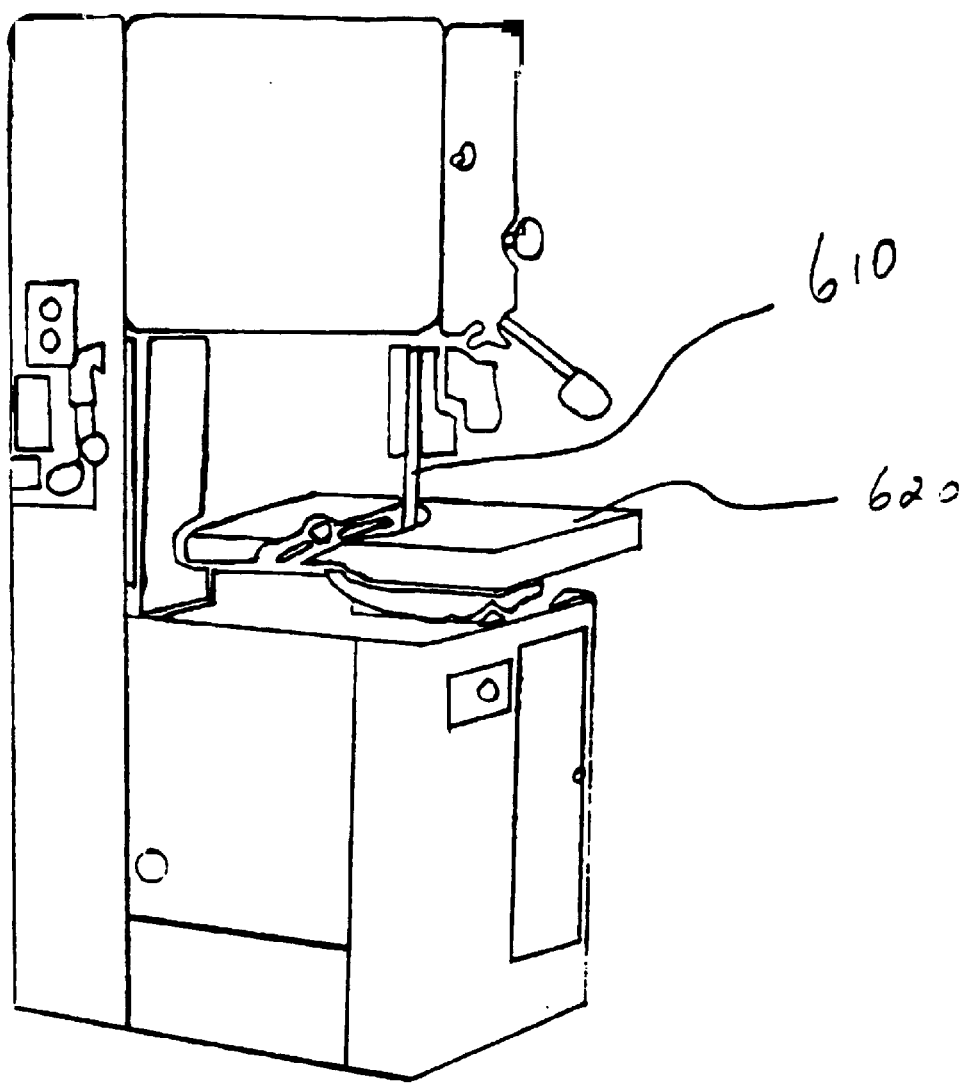
FIG. 6 shows a cutting machine with a band saw.

In an alternate embodiment, the cutting tip oriented according to the novel teachings of the present application is incorporated in a band saw rather than in a circular saw. FIG. 4 shows an example of such a band saw with the novel alignment of the cutting tip. The carrier blade 110 in this case is a band saw rather than a circular saw. The cutting tip 120 once again is a slab of ultrahard material 150 bonded to a slab of carbide 160. The cutting tip 120 is attached to the carrier blade 110 by brazing the cutting tip 120 into the pocket 140 of the carrier blade 110. The plane of the joint between the slab of ultrahard material 150 and the slab of carbide 160 which is parallel to the longitudinal 135 axis of the cutting tip is oriented such that it is less than 45 degrees away from a line that is tangent to the edge of the carrier blade 110. The slab of ultrahard material is on the top 170 side of the cutting tip 120 farthest away from the carrier blade 110. An example of a cutting machine having a band saw suitable for utilizing the cutting tips presently disclosed is shown in FIG. 6. The cutting machine has a band saw 610, a table 620 for placing the material on for cutting, and a motor (not shown) for running the saw.

According to a disclosed class of innovative embodiments, there is provided: a saw, comprising: a carrier blade; a cutting tip having a first ultrahard layer and a second layer; said cutting tip being attached to said carrier blade; and said cutting tip being oriented such that the center of mass of said first layer is generally farther from said carrier blade than is the center of mass of said second layer.

According to another disclosed class of innovative embodiments, there is provided: a saw, comprising: a carrier blade; a cutting tip, attached to said carrier blade, having a principal cutting face and having a first layer and a second layer; wherein at least a portion of said first layer is exposed on said cutting face; said first layer being a cemented composite of ultrahard materials and a binding medium; and said second layer being an ultrahard material and not including a binding medium.

According to another disclosed class of innovative embodiments, there is provided: a saw, comprising: a carrier blade; a cutting tip, attached to said carrier blade, having a principal cutting face and having a first cutting material and a second cutting material; wherein at least a portion of said first cutting material is exposed on said cutting face; said first cutting material is bonded to said second cutting material; said first and second cutting materials are brazed to said carrier blade; said first cutting material is harder and more brittle than said carrier blade; and said second cutting material is harder and more brittle than said first cutting material.

According to another disclosed class of innovative embodiments, there is provided: a saw, comprising: a carrier blade; a plurality of cutting tips having a slab of ultrahard material and a slab of non-ultrahard material connected by a joint; a supporting blade connecting said cutting tip to said carrier blade; wherein the joint between said slab of ultrahard material and said slab of non-ultrahard material is oriented at an angle less than 45 degrees away from a line that is parallel to a tangent line to the edge of said carrier blade.

According to another disclosed class of innovative embodiments, there is provided: a saw, comprising: a carrier blade; a cutting tip attached to said carrier blade; said cutting tip being constructed from an ultrahard material; and said cutting tip having a principal axis which is oriented less than 45 degrees away from a line that is tangent to the edge of said carrier blade.

According to another disclosed class of innovative embodiments, there is provided: a cutting machine, comprising: a saw having a carrier blade, a supporting blade, and a cutting tip; said cutting tip having a slab of ultrahard material and a slab of non-ultrahard material; said cutting tip being oriented such that a cutting force is directed principally along a line substantially parallel to the joint between slab of ultrahard material and said slab of non-ultrahard material.

According to another disclosed class of innovative embodiments, there is provided: a method of fabricating a saw, comprising: forming a carrier blade; forming a supporting blade on said carrier blade; bonding an ultrahard material to a non-ultrahard material to form a cutting tip; brazing said cutting tip onto said supporting blade such that the plane of a joint between said ultrahard material and said non-ultrahard material is oriented at an angle of less than 45 degrees away from the direction of cutting.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Although the presently preferred embodiment has been described primarily with reference to a circular saw, it will be apparent to one skilled in the art that the present teaching may be applied to other types of circular and linear cutting tools as well including but not limited to milling cutters, band saw blades, shaper blades, and form and panel cutters. It should also be noted that the present embodiment is readily applied to tooth geometry's known in the industry as straight top, triple tip, half bevel, and any other tooth geometry for which the cutting edge can be contained within the ultrahard layer of the cutter tip. It should also be noted that modifications and variations of the present teachings will be obvious to those skilled in the art and that such modifications and variations are believed to be within the scope of the present application. Furthermore, the angles of attack will vary slightly depending on the type of saw used as will be obvious to those skilled in the art. Likewise, those skilled in the art will be familiar with common terms, including the center of mass of an object, which is a deterministic calculation and is unique to an object depending on its physical characteristics.

Although the present embodiment is not generally applicable to tooth geometries referred to in the industry as "ATB" and "Combo" grinds, this deficiency is not thought to be a major disadvantage since the use of ultrahard materials, particularly PCD, is thought to obviate the need for these grinds. However, if it is necessary to produce a "ATB" or "Combo" tooth configuration, this can be accomplished simply by grinding the base of the pocket of the tool body at an angle with respect to the rotating axis of the tool. The teeth would be manufactured to include the proper side angles and then brazed into the modified pocket. The cutting geometry of the tool would be exactly the same as though the teeth were mounted in the customary fashion and then ground into shape.

The presently preferred embodiment has application to both stationary and portable saws. However, a stationary saw is preferred because lack of stability of the saw could possibly cause cutting tip damage. It is contemplated that the primary use for the present teachings will be in industry, but commercial and home uses are possible as well. It is further contemplated that the present teachings will primarily be applied to cut man made materials such as medium density fiberboard, chipcore, wafer board, plastics, etc., (most of which are abrasive in nature) and to cut all non-ferrous metals. However, the present teachings could be used to cut other materials as well.

Although the presently preferred embodiment has been described primarily with reference to carbide composite compounds, it will be apparent to those skilled in the relevant art that other composite compounds other than carbide can be used and in fact any other superhard material with similar properties, including shock resistance, could be substituted for carbide. It will also be apparent to one skilled in the art that other ultrahard materials may be substituted for the polycrystalline diamond and cubic boron nitride materials.

What is claimed is:

1. A saw, comprising:
   a carrier blade;
   a cutting tip having a first layer and a second layer;
   said cutting tip being attached to said carrier blade; and
   said cutting tip being oriented such that a center of mass of said
      first layer is generally farther from a center of mass;
      of said carrier blade than is any portion of said second layer;
   wherein said first layer is a material harder than any tungsten carbide composition.

2. A saw, comprising:
   a carrier blade;
   a cutting tip having a first layer and a second layer;
   said cutting tip being attached to said carrier blade; and
   said cutting tip being oriented such that a center of mass of said
      first layer is generally farther from a center of mass;
      of said carrier blade than is any portion of said second layer;
   wherein said second layer is a sintered metal carbide having carbide materials contained in a metal matrix; and
   said first layer does not comprise a metal matrix.

3. The saw of claim 2, wherein said carrier blade has a supporting blade and said cutting tip does not extend beyond the supporting blade.

4. The saw of claim 2, wherein a cutting force is directed principally along an axis that is less than 45 degrees away from a plane where said first layer and said second layer meet.

5. The saw of claim 2, wherein said cutting tip has a back that is not normal to a bottom of said cutting tip.

6. The saw of claim 2, wherein said first layer is an ultrahard material.

7. The saw of claim 2, wherein said first layer is polycrystalline diamond.

8. The saw of claim 2, wherein said first layer is cubic boron nitride.

9. The saw of claim 2, wherein said first layer is thinner than said second layer.

10. The saw of claim 2, further comprising a second cutting tip that does not contain ultrahard material.

11. The saw of claim 2, wherein said cutting tip has a principal cutting surface which is not parallel to a plane created at an interface between said first layer and said second layer.

12. The saw of claim 11, wherein at least a portion of said second layer is exposed on a face of said cutting tip.

13. A cutting machine, comprising:
    a saw having a carrier blade and a cutting tip;
    said cutting tip having a slab of ultrahard material and a slab of non-ultrahard material; and
    said slab of non-ultrahard material, said slabs being generally planar and generally coextensive; and further comprising:

a second cutting tip which does not contain ultrahard material.

14. The cutting machine of claim 13, wherein said saw is a circular saw.

15. The cutting machine of claim 13, wherein said saw is a rotating cutting device.

16. The cutting machine of claim 13, wherein said saw is a linear cutting device.

17. The cutting machine of claim 13, wherein said saw is a band saw.

* * * * *